United States Patent [19]

Nelson

[11] Patent Number: 5,025,398

[45] Date of Patent: Jun. 18, 1991

[54] DATA STREAM INDEPENDENT PRINTER

[75] Inventor: Thomas C. Nelson, Melbourne, Fla.

[73] Assignee: Storage Technology Corporation, Louisville, Colo.

[21] Appl. No.: 526,505

[22] Filed: May 21, 1990

[51] Int. Cl.⁵ .............................................. G60K 15/00
[52] U.S. Cl. ..................................... 364/519; 364/518
[58] Field of Search ................................ 364/518–520, 364/235 MS File, 830 MS File, 942.2 MS File, 942.6 MS File, 238.5 MS File, 242.5 MS File; 346/154; 400/61–62

[56] References Cited

U.S. PATENT DOCUMENTS 4,779,105 10/1988 Thomson et al. .................. 346/154

Primary Examiner—Arthur G. Evans
Attorney, Agent, or Firm—Dorr, Carson, Sloan & Peterson

[57] ABSTRACT

The above described problems are solved and a technical advance achieved in the field by the data stream independent printer of the present invention. This printer is a nonimpact printer that is compatible with host processors that are programmed to operate line printers and host processors that are programmed to operate nonimpact printers. This compatibility is achieved by the use of conversion apparatus that emulates the operation of a line printer, such as a high speed band printer, when the associated host processor is programmed to operate high speed line printers. The conversion apparatus responds to the line printer control signals produced by the host processor to control the operation of the nonimpact printer. This conversion apparatus stores a plurality of character set definitions, overlays, copy modifications and setups on a disk drive memory located in the printer system so that the band definition information provided by the host can be translated into print character generation control signals. In operation, the host processor transmits a band identification data to the printer system, which data is used to retrieve from the disk memory to form and format of the character set that is available to the host processor. The host processor then transmits lines of printing into a line buffer located in the conversion apparatus. The lines of printing are formatted by the host processor as data indicative of a selected character on the print band and its desired position in the line of output print. The conversion apparatus translates the character identification and position into control signals that cause the nonimpact printer to generate the requested character in the requested position on a page basis with any named overlays and copy modifications. The use of this conversion apparatus enables nonimpact printers to be substituted for high speed line printers without any corresponding reprogramming of the software on the front processor. The conversion apparatus emulates the operation of a high speed line printer to the host processor while simultaneously emulating a nonimpact printer programmed host processor to the nonimpact printer.

17 Claims, 2 Drawing Sheets

DATA STREAM INDEPENDENT PRINTER

FIELD OF THE INVENTION

This invention relates to printers and in particular to a nonimpact printer that is capable of interfacing with a host computer that is programmed to operate a line printer, such as a high speed band printer.

PROBLEM

It is a problem in the field of printer systems to interconnect diverse types of printer systems to a host processor. A typical host computer is programmed to run a plurality of applications programs that generate a print output. The software on the host computer is written to interconnect with a specific type of printer system. When the printer system is changed from one class of printer to another, the host computer software must all be rewritten in order for the applications programs to be able to interface with the new printer system.

Printer systems can be characterized into two main categories. A first type of printer is the line printer, such as a high speed band printer which uses a continuous band of print characters. Each print character is located in a predetermined position on the band, which position is a function of the model of print band. In such a printer system, the character set is limited to a standard group of alphanumeric characters located in predefined positions. The host processor downloads data indicative of the print characters on the print bands to the printer system, which print band definition may be verified by the printer system based on a band identification indicia imprinted on the print band itself or accepted without verification depending on type of printer. Printing is controlled on a line basis, with the print data defining a line of print. In the case of nonimpact printers, there is a vast array of characters and graphics that can be printed by the printer system. The nonimpact printers require the host computer to provide a continuous stream of data which identifies what is to be printed on the print media. Printing in nonimpact printers is controlled on a page basis, with the print data defining a page of print.

It is obvious that these two types of printer systems are significantly incompatible in terms of the type of data that must be transmitted from the host computer to the printer system in order to control the print output. The application programs resident on the host computer cannot interface with both types of printer systems and must all be written to focus on a single type of printer system.

SOLUTION

The above described problems are solved and a technical advance achieved in the field by the data stream independent printer of the present invention. This printer is a nonimpact printer that is compatible with host processors programmed to operate line printers and host processors programmed to operate nonimpact printers. This compatibility is achieved by the use of conversion apparatus that emulates the operation of a line printer, such as a high speed band printer, when the associated host processor is programmed to operate high speed band printers. The conversion apparatus responds to the band printer control signals produced by the host processor to control the operation of the nonimpact printer. This conversion apparatus stores a plurality of character set definitions on a disk drive memory located in the printer system so that the band definition information provided by the host can be translated into print character generation control signals. In operation, the host processor transmits a band identification data to the printer system, which data is used to retrieved from the disk memory the form and format of the character set that is available to the host processor. The host processor then transmits lines of printing into a line buffer located in the conversion apparatus. The lines of printing are formatted by the host processor as data indicative of a selected character on the print band and its desired position in the line of output print. The conversion apparatus translates the character identification and position into control signals that cause the nonimpact printer to generate the requested character in the requested position on a page basis with any named overlays and copy modifications. The use of this conversion apparatus enables nonimpact printers to be substituted for high speed band printers without any corresponding reprogramming of the software on the host processor. The conversion apparatus emulates the operation of a high speed line printer to the host processor while simultaneously emulating a nonimpact printer programmed host processor to the nonimpact printer.

DETAILED DESCRIPTION

Figure 1:
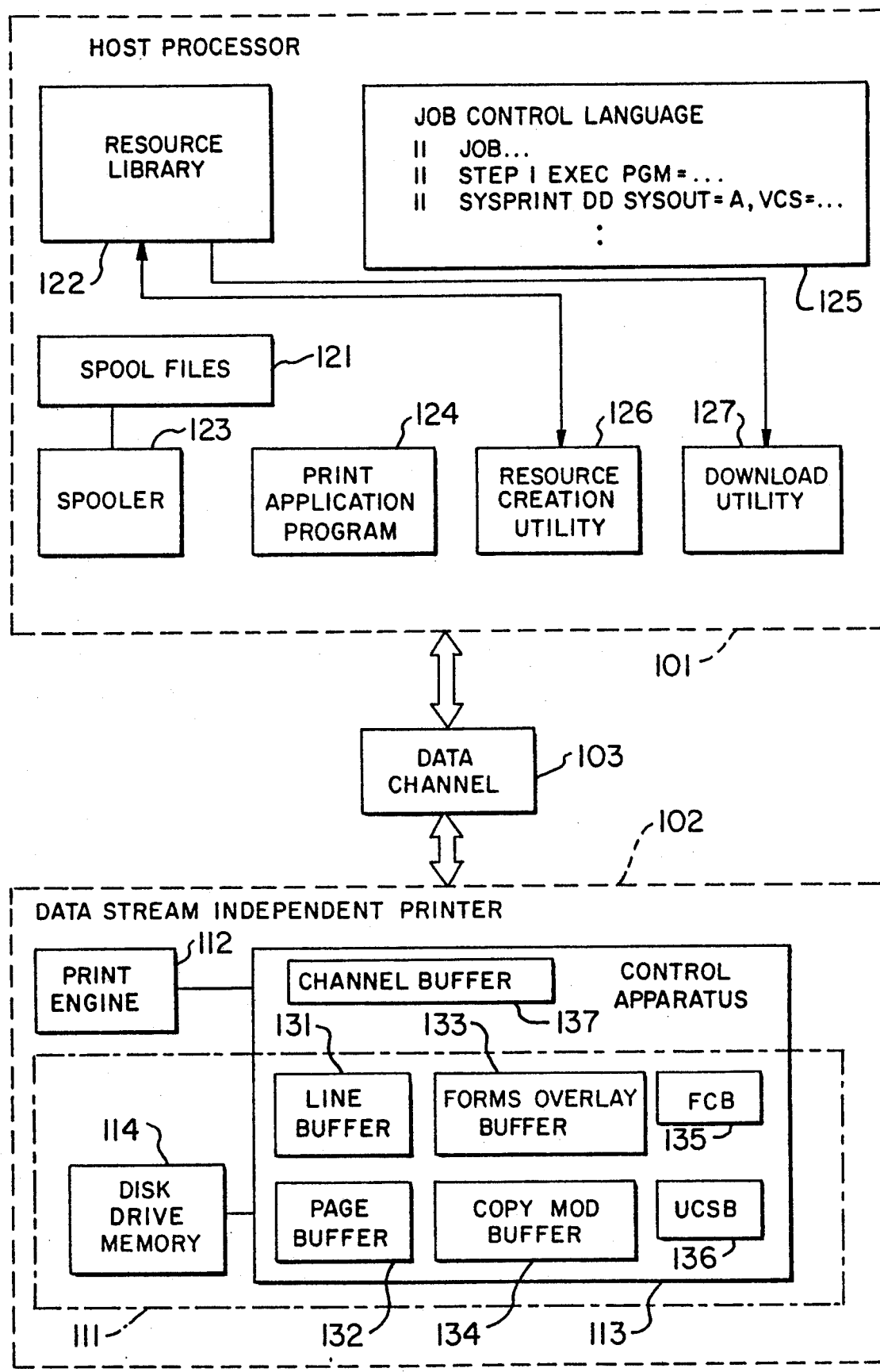
FIG. 1 illustrates in block diagram form the basic architecture of a host computer printing system installation including the data stream independent printer.

High speed printer systems generally are either high speed line printers such as band printers or nonimpact printers such as all points addressable printers. The high speed band printers make use of a continuous band upon which are imprinted a character set. This continuous band is rotated at a high speed in front of a bank of impact hammers which are positioned uniformly across the width of the print media, one print hammer in each print position across the page. The print band contains multiple appearances of each character in the character subset. Each print character appears in predefined positions along the length of the print band in a different configuration for each model of print band. Thus, a host processor that is equipped with a high speed band printer initiates a printing operation by downloading a definition of the character set on the print band to the band printer. In operation, the printing is accomplished by the host processor transmitting lines of print to the high speed band printer, which lines of print are formatted by the host processor as data indicative of print character identification and print character location. This transmitted data is used by the band printer to activate a corresponding print hammer for each print position when the character designated for this print position appears on the print band in front of the print hammer. All printing is on a line basis.

The high speed nonimpact printers typically comprise all points addressable printers which can produce any sort of indicia on the print media. These printers are not restricted to a single predefined character set as are the band printers. The all points addressable printers require a complex software interface to provide the control necessary for the host processor to define the indicia to be printed on the print media. The complexity of the interface is a result of the tremendous diversity of indicia that can be printed by an all points addressable printer. In addition, printing is accomplished on a page basis. Needless to say, such a printer is significantly incompatible with a host processor that is programmed to operate a high speed band printer.

The incompatibility between high speed all points addressable nonimpact printers and band printers provides a significant cost penalty to a user in changing from a band printer to a nonimpact printer. Not only must the user incur the cost of the nonimpact all points addressable printer but must also expend significant programmer resources to reprogram the software resident on the host processor to be compatible with the nonimpact all points addressable printer interface. In order to overcome this inherent incompatibility between nonimpact printers and band printers, the data stream independent printer of the present invention is equipped with conversion apparatus that enables this printer to be connected to a host processor programmed to interface with either a high speed band printer or a nonimpact all points addressable printer.

This conversion apparatus includes a disk drive memory that stores the representations of a plurality of character sets that are typically found on print bands. A software interface is also provided to respond to the print band control signals received from a host processor and convert these control signals into printer activation signals for the all points addressable print mechanism. This conversion apparatus includes a buffer memory that responds to the universal character set definition transmitted by the host processor by retrieving a corresponding set of printer control data from the disk memory. As the host processor transmits print control information on a line by line basis, the conversion apparatus in transparent fashion uses the retrieved character set definition information to convert the character identification and location data produced by the host processor into the control signals required by the all points addressable printer to print the corresponding characters on the print media on a page basis.

Printer Architecture

FIG. 1 illustrates the architecture of a printing system that includes the data stream independent printer of the present invention. In this block diagram, host processor 101 is a typical processor, such as a IBM Model System/370 system. The host processor 101 is programmed to operate with a line oriented printer, such as an IBM Model 3211 printer. The data stream independent printer 102 of the present invention consists of a nonimpact printer 110 that includes interface conversion apparatus 111 that emulates the operation of a line printer to host processor 101. Nonimpact printer 110 includes a standard all points addressable print engine 112 and control apparatus 113 that are well known in the art. These elements are not discussed in detail herein for the purpose of simplicity.

Host processor 101 includes spool files 121, resource library 122, spooler 123 and print application program 124, which elements are standard host processor software elements. In a line printer environment, the host processor 101 provides job control and job entry control facilities to load a forms control buffer (FCB) and a universal character set buffer (UCSB) located in the associated line printer. This is accomplished by the user providing job control parameters (ex 125) to access the FCB and UCSB definition data stored in resource library 122. Alternatively, an operator can generate commands to spooler 123 to produce spool files 121 that contain FCB and UCSB data retrieved from resource library 122. In either case, host processor 101 accesses the designated forms control buffer and universal character set buffer data from its memory and translates this retrieved data into device dependent channel commands that are used to load this data into the forms control buffer and universal character set buffer that is located in the associated line printer.

The data stream independent printer 102 does not contain the forms control buffer and universal character set buffer of the line printer but instead stores the received forms control and universal character set data in control apparatus 113 in a manner that emulates the operation of these two buffers. The data stored in the universal character set buffer (UCSB) contains the EBCDIC representation of the graphics (print characters) located on the print train (Band) in the order in which they appear on the print train. A typical UCSB data set is 512 bytes. The data stored in the forms control buffer (FCB) contains the vertical spacing and skipping information that is used to position lines of print on a page. A typical FCB data set is 256 bytes.

A difficulty with the universal character set buffer is that its limited size (512 bytes) prevents the transfer of character set definition data for a nonimpact all points addressable printer which requires 8K to 52K of character definition data (typically). Therefore, the data stream independent printer 102 uses the universal character set buffer data as pointers to reference a set of nonimpact printer character definition data that is stored in data stream independent printer 102 on disk drive memory 114. In addition, other parameters can be transmitted via entries into the universal character set buffer data, such as: forms overlay names, copy modification segment names and copy counts.

The creation of these character set definitions, overlays and copy modifications is accomplished by the use of resource creation utility 126 and download utility 127 resident on host processor 101. The character set, overlay and copy modification creation is accomplished independent of the printing operation and can be a background process on host processor 101. The download utility 127 retrieves data from resource library 122 and download utility 127 transmits this data over data channel 103 to data stream independent printer 102 where it is stored on disk drive memory 114.

Control apparatus 113 implements an interface to the data channel 103 that interconnects host processor 101 and data stream independent printer 102. The interface to data channel 103 conforms to the specification entitled "IBM System/360 and System/370 I/O Interface Channel to Control Unit OEMI" (GA22-6984-08). The control channel interface in control apparatus 113 implements the following features defined in this specification:

Block Multiplexer
Single-tag Interlock
Double-tag Interlock
Channel Command Retry
Static Two Channel Switch
Data Streaming 1.25/3.0 MB/sec/4.5 MB/sec For the purpose of emulating a line printer, conversion apparatus 114 emulates the command set, status and sense reporting functions as defined (for example) in the specification entitled "IBM 3211 Printer, 3216 Interchangeable Train Cartridge, and 3811 Printer Control Unit Component Description and Operator's Guide" (GA24-3543-9). Host processor 101 runs application program 124 which generates print output data. Host processor 101 transmits the generated print data one line at a time to data stream independent line printer 102 via data channel 103. The length of each line of print data is speCified by the count contained in the channel command word (CCW). The print lines are placed into a channel buffer 137 in control apparatus 113 as they are received from data channel 103. Control apparatus 113 translates the received print data using the character set definition data retrieved from disk drive memory 114 as specified by the data received in the universal character set buffer 136. Copy modification buffer 134 and forms overlay buffer 133 are loaded from disk drive memory 114 by the control apparatus from data specified in UCSB load data 136. Once control apparatus 113 translates the received line of print data, each translated line is placed into a page buffer 132 where they are assembled into a page of print data. When a complete page is assembled, control apparatus 113 activates print engine 112 in well known fashion to print the page of data as if the page had been transmitted by host processor 101 in all points addressable form directly. Control apparatus 113 uses the data contained in the forms control buffer 135 to determine line spacing and skipping for the purpose of populating a page buffer 132. Control apparatus 113 includes copy modification: data 134 and overlay data 133 on printed page if indicated in UCSB load data 136.

Downloading Printer Resident Resources

Printer resources that are stored on disk drive memory 114 include the following:
- Character Arrangement Tables
- Graphic Modification Modules
- Forms Overlay Buffers
- Copy Modification Modules
- Configuration Modules
- Forms Control Buffers Host processor 101 transfers these resources to data stream independent printer 102 via data channel 103 using download utility 127. This transfer is accomplished by use of the Diagnostic Write (X'05') channel command. Using this channel command, data is transferred in 8K blocks to disk drive memory 114 via interface conversion apparatus.

Copy Modification and Overlay Buffers

Figure 2:
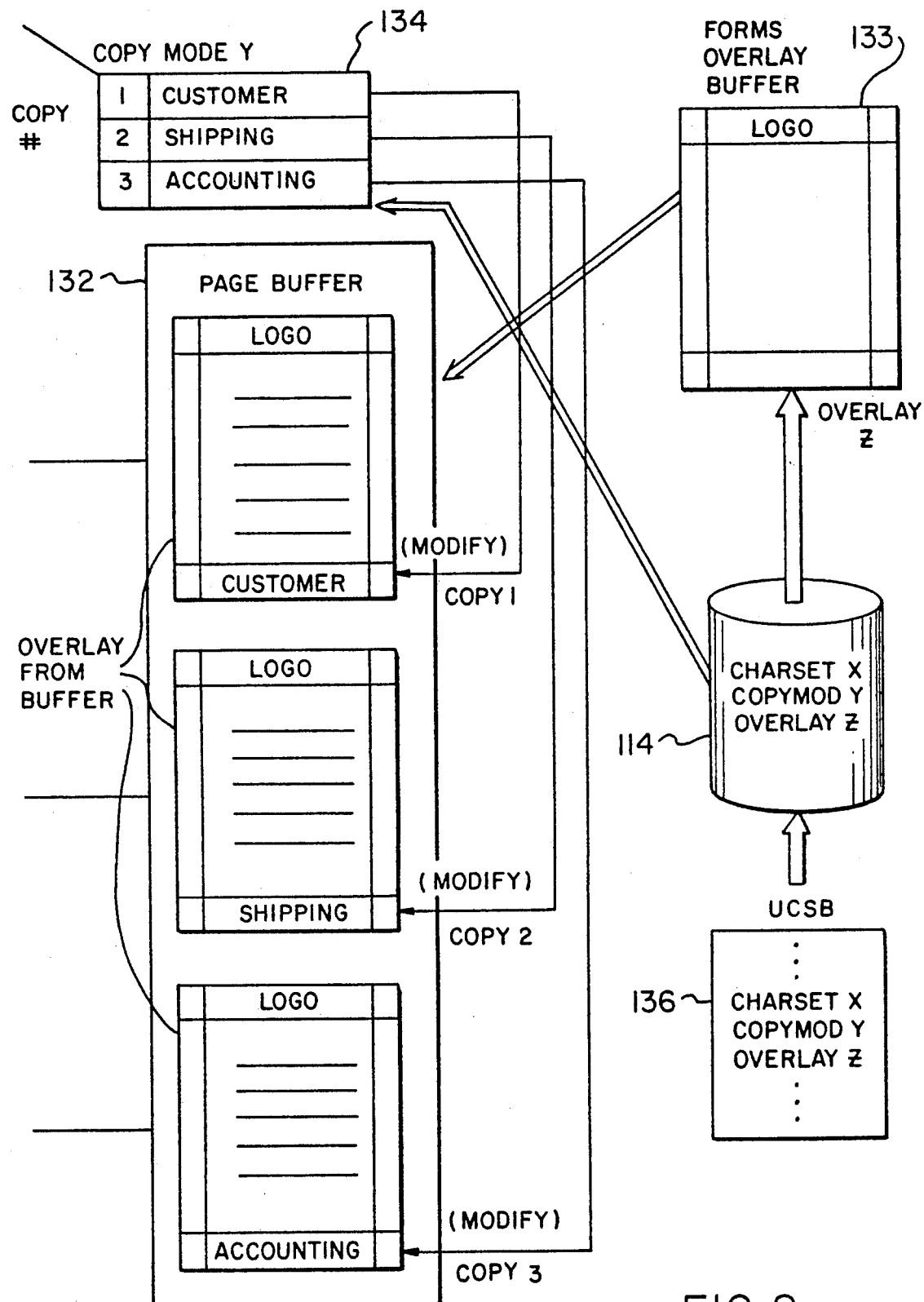
FIG. 2 illustrates additional details of the interface conversion apparatus.

FIG. 2 illustrates additional details of interface conversion apparatus 111. In particular, disk drive memory 114 contains therein a plurality of records, labeled for example CHARSET X, COPYMOD Y, OVERLAY Z which correspond to a character definition, multiple copy modification instructions and overlay format, respectively. The UCSB buffer 136 receives print control data as described above, represented in FIG. 2 as CHARSET X, COPYMOD Y, OVERLAY Z. Each of these designated items represents a pointer for disk drive memory 114. Thus, control apparatus 113 uses the CHARSET X pointer from UCSB buffer 136 to address the character definition data contained in disk drive memory 114 under the file name CHARSET X. Control apparatus 113 uses this character definition data to translate each line of line printer data received from host processor 101 into print data for all points addressable nonimpact print engine 112. This converted data is loaded by control apparatus 113 into page buffer 132.

Control apparatus 113 also loads any forms overlay format into page buffer 132. This is controlled by the OVERLAY Z pointer (if any) written into UCSB buffer 136 by host processor 101. The OVERLAY Z pointer is used by control apparatus 113 to address the corresponding forms overlay stored in disk drive memory 114 and write it to forms overlay buffer 133, from whence it is written to page buffer 132 for each page of print that includes a forms overlay. Control apparatus 113 also uses pointer COPYMOD Y stored in UCSB buffer 136 to address the corresponding copy modifications stored in disk drive memory 114. The table or list of copy modifications (if any) are loaded into copy modification buffer 134 from whence they are written to the appropriate location in page buffer 132. FIG. 2 illustrates three entries in copy modification buffer 134 and their corresponding appearance on three successive pages of print media. Thus, control apparatus 113 uses the line printer UCSB and FCB data transmitted by host processor as page/character definition information to correct the line by line print band control data into the page control required by an all points addressable printer. Forms overlay and copy modification capabilities are provided by using corresponding UCSB data as pointers to retrieve predefined forms and copy modifications from disk drive memory. These items are stored in buffers and merged with the generated page print data to produce an entire printed page in a form used to activate the all points addressable nonimpact print engine 112.

While a specific embodiment of this invention has been disclosed, it is expected that those skilled in the art can and will design alternate embodiments of this invention that fall within the scope of the appended claims.

I claim:
1. In a nonimpact printer system, an interface for interconnecting said nonimpact printer with a host processor line printer print driver that transmits lien printer setup data and line printer character definition data prior to transmitting line printer print character data comprising:
   means for storing said line printer setup and line printer character definition data received from said print driver;
   memory means for storing a plurality of character set definitions, forms overlays and copy modifications, each of said character set definitions including a plurality of print character definitions;
   means, responsive to said stored line printer character definition data received from said print driver, for translating independent of operator intervention, said line printer character definition data into character set selection data;
   means, responsive to said character set selection data, for selecting the one of said character set definitions stored in said memory means corresponding to said stored line printer character definition data;
   means for converting said stored line printer setup data into corresponding nonimpact printer control signals; and
   means for activating said nonimpact printer to print a print character corresponding to each received print character data along with forms overlays and copy modifications as designated by said line printer setup data.

2. The apparatus of claim 1 wherein said activating means includes:
   line buffer means for buffering said received print character data on a line basis;
   means for translating said stored line of print character data to a corresponding line of nonimpact print data using said selected character set definition;
   page buffer means for storing a plurality of said corresponding lines of nonimpact print data;
   forms overlay buffer means for storing forms overlay data;
   means for writing said forms overlay data into said page buffer means;
   copy modification buffer means for storing copy modification data;
   means for writing said copy modification data into said page buffer means; and
   means responsive to said page buffer means storing an entire page of print data forms overlay data and copy modification data for printing said stored page of print data.

3. The apparatus of claim 2 wherein said activating means further includes:
   means responsive to said converting means for formatting each said line of nonimpact print data using said nonimpact printer control signals.

4. In a nonimpact printer system, a method of interconnecting said nonimpact printer with a host processor line printer print driver that transmits line printer setup data and line printer character definition data prior to transmitting line printer print character data comprising the steps of:
   storing said line printer setup and line printer character definition data received from said print driver;
   storing in a memory a plurality of character set definition, forms overlays and copy modifications;
   translating, independent of operator intervention, said received line printer character definition data into character set selection data;
   selecting, in response to said character set definition data, the one of said character set definitions stored in said memory corresponding to said stored line printer character definition data;
   converting said stored line printer setup data into corresponding nonimpact printer control signals; and
   activating said nonimpact printer to print a print character corresponding to each received print character data.

5. The method of claim 4 wherein said step of activating includes the steps of:
   buffering in a line buffer said received print character data on a line basis;
   translating said stored line of print character data to a corresponding line of nonimpact print data using said selected character set definition;
   storing in a page buffer at a plurality of said corresponding lines of nonimpact print data; and
   printing, in response to said page buffer storing an entire page of print data, said stored page of print data.

6. The method of claim 5 wherein said step of activating further includes the step of:
   formatting each said line of nonimpact print data using said nonimpact printer control signals.

7. In a printer system having a nonimpact printer and a host processor equipped with a line printer print driver, wherein said line printer print driver transmits line printer setup data, forms overlays, copy modifications and line printer character definition data to said nonimpact printer prior to transmitting print character data, a printer interface connected to and interconnecting said line printer print driver and said nonimpact printer comprising:
   means connected to said line printer print driver for emulating a line printer, including:
   means for storing said line printer setup and line printer character definition data received from said line printer print driver;
   memory means for storing a plurality of character set definitions, forms overlays and copy modifications;
   means for translating, independent of operator intervention, said received line printer character definition data into character set selection data;
   means, responsive to said character set selection data, for selecting the one of said character set definitions stored in said memory means corresponding to said stored line printer character definition data;
   means for selecting the one of said forms overlays stored in said memory means; and
   means for selecting the one of said copy modifications stored in said memory means; and
   means connected to said nonimpact printer and said emulating means for converting line printer control signals received from said line printer print driver into nonimpact printer print control signals.

8. The apparatus of claim 7 wherein said printer interface further comprises:
   means for activating said nonimpact printer to print a print character corresponding to each received print character data.

9. The apparatus of claim 8 wherein said activating means includes:
   line buffer means for buffering said received print character data on a line basis;
   means for translating said stored line of print character data to a corresponding line of nonimpact print data using said selected character set definition;
   page buffer means for storing a plurality of said corresponding lines of nonimpact print data; and
   means responsive to said page buffer means storing an entire page of print data for printing said stored page of print data.

10. The apparatus of claim 9 wherein said activating means further includes:
    means responsive to said converting means for formatting each said line of nonimpact print data using said nonimpact printer control signals.

11. The apparatus of claim 7 further including:
    means, located in said host processor, for generating said character set definitions, forms overlays and copy modifications; and
    means, located in said host processor, responsive to said generating means for transmitting said generated character set definition to said memory means.

12. In a nonimpact printer system, an interface for interconnecting said nonimpact printer, that prints print data on a page by page basis, with a line printer print driver that transmits line printer setup data and line printer character definition data prior to transmitting print character data, said print character data being transmitted one line at a time, comprising:
    means for storing said line printer setup, forms overlays, copy modifications and line printer character definition data received from said print driver;

memory means for storing a plurality of character set definitions, each of said character set definitions including a plurality of print character definitions;

means, responsive to said stored line printer character definition data received from said print driver, for translating, independent of operator intervention, said line printer character definition data into character set selection data;

means, responsive to said character set selection data, for selecting the one of said character set definitions stored in said memory means corresponding to said stored line printer character definition data;

means for converting said stored line printer setup data into corresponding nonimpact printer control signals;

line buffer means for buffering said received print character data on a line basis;

means for translating said stored line of print character data to a corresponding line of nonimpact print data using said selected character set definition;

page buffer means for storing a plurality of said corresponding lines of nonimpact print data; and means responsive to said page buffer means storing an entire page of print data for printing said stored page of print data.

13. The apparatus of claim 12 wherein said translating means includes:
means responsive to said converting means for formatting each said line of nonimpact print data using said nonimpact printer control signals.

14. In a nonimpact printer system, a method of interconnecting said nonimpact printer, that prints print data on a page by page basis, with a line printer print driver that transmits line printer setup data and line printer character definition data prior to transmitting print character data, said print character data being transmitted one line at a time, comprising the steps of:
storing said line printer setup and line printer character definition data received from said print driver;
storing in a memory a plurality of character set definitions;
translating said received line printer character definition data independent of operator intervention to character set selection data;
selecting, in response to said character set selection data, the one of said character set definitions stored in said memory corresponding to said stored line printer character definition data;
converting said stored line printer setup data into corresponding nonimpact printer control signals;
buffering in a line buffer said received print character data on a line basis;
translating said stored line of print character data to a corresponding line of nonimpact print data using said selected character set definition;
storing in a page buffer a plurality of said corresponding lines of nonimpact print data; and
printing, in response to said page buffer storing an entire page of print data, said stored page of print data.

15. The method of claim 14 wherein said step of translating includes the steps of:
formatting each said line of nonimpact print data using said nonimpact printer control signals.

16. In a system where a host processor is connected to a nonimpact printer system via a data channel, said host processor including a band printer print driver that transmits line printer setup data and print band definition data on said data channel prior to transmitting print character data on a line by line basis, an interface for interconnecting said nonimpact printer system to said line printer print driver comprising:
means for storing said line printer setup and print band definition data received from said print driver via said data channel;
memory means for storing a plurality of print band character set definitions;
means for selecting the one of said print band character set definitions stored in said memory means corresponding to said stored print band definition data;
line buffer means for buffering said received print character data on a line basis;
means for translating each print character data in said stored line of print character data into corresponding nonimpact print data using said selected character set definition;
means for converting said stored line printer setup data into corresponding nonimpact printer control signals;
means for formatting said corresponding nonimpact print data using said corresponding nonimpact printer control signals;
page buffer means for storing a plurality of said corresponding nonimpact print data;
means responsive to said page buffer means storing an entire page of print data for printing said stored page of print data.

17. The apparatus of claim 16 further including:
means, located in said host processor, for generating said character set definitions; and
means, located in said host processor, responsive to said generating means for transmitting said generated character set definition to said memory means.

* * * * *